US008630956B2

(12) United States Patent
Arisawa et al.

(10) Patent No.: US 8,630,956 B2
(45) Date of Patent: Jan. 14, 2014

(54) OBSCURING IMAGE OF PERSON IN PICTURE WHEN CONSENT TO SHARE IMAGE IS DENIED

(75) Inventors: Shigeru Arisawa, Tokyo (JP); Shuhei Sonoda, Kanagawa (JP); Seiji Esaka, Tokyo (JP); Masayuki Takada, Tokyo (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 13/173,239

(22) Filed: Jun. 30, 2011

(65) Prior Publication Data
US 2012/0011197 A1 Jan. 12, 2012

(30) Foreign Application Priority Data

Jul. 8, 2010 (JP) ................................. 2010-155598

(51) Int. Cl.
*G06Q 99/00* (2006.01)
(52) U.S. Cl.
USPC ......................................................... 705/319
(58) Field of Classification Search
USPC ........ 705/319; 726/28; 380/54; 381/115, 118
See application file for complete search history.

(56) References Cited

U.S. PATENT DOCUMENTS

| | | | | |
|---|---|---|---|---|
| 7,899,210 | B2* | 3/2011 | Dorai et al. | 382/103 |
| 8,041,784 | B1* | 10/2011 | Amidon et al. | 709/220 |
| 2007/0152037 | A1* | 7/2007 | Chen et al. | 235/380 |
| 2009/0313254 | A1* | 12/2009 | Mattox et al. | 707/9 |
| 2010/0048242 | A1* | 2/2010 | Rhoads et al. | 455/556.1 |
| 2010/0158380 | A1* | 6/2010 | Neville et al. | 382/190 |
| 2011/0034176 | A1* | 2/2011 | Lord et al. | 455/450 |
| 2011/0064281 | A1* | 3/2011 | Chan | 382/118 |
| 2011/0313956 | A1 | 12/2011 | Abe et al. | |
| 2011/0319094 | A1 | 12/2011 | Usui et al. | |

OTHER PUBLICATIONS

Perez, Facial Recognition Comes to Facebook. Internet Article, Read Write Web. Mar. 24, 2009;1-5. Last accessed Oct. 20, 2011 at http://www.readwriteweb.com/archives/facial_recognition_comes_to_facebook.php.
[No Author Listed], Google Street View privacy concerns. Wikipedia. May 29, 2010;p. 1-9. http://en.wikipedia.org/w/index.php?title=Google_Street_View_privacy_concerns&oldid=364871895 [last accessed Sep. 8, 2012].

(Continued)

*Primary Examiner* — Lance L Barry
(74) *Attorney, Agent, or Firm* — Wolf, Greenfield & Sacks, P.C.

(57) ABSTRACT

Some embodiments of the invention provide a server apparatus, comprising: a control block comprising at least one processor; at least one data reception unit operable to receive a request to share a picture; at least one storage facility, storing programmed instructions for execution by the control block, the programmed instructions defining an image analysis engine operable to determine that the picture comprises an image of a person; and at least one data transmission unit operable to issue a request to the person, or someone associated with the person, to consent to sharing the image. Other embodiments provide a method, performed by at least one computer. The method comprises: (A) receiving a request to share a picture; (B) determining that the picture comprises an image of a person; and (C) requesting that the person, or someone associated with the person, consent to sharing the image.

12 Claims, 9 Drawing Sheets

(56) References Cited

OTHER PUBLICATIONS

[No Author Listed], Pixelization. Wikipedia. Jul. 3, 2010;p. 1-3. http://en.wikipedia.org/w/index.php?title=pixelization&oldid=371482189 [last accessed Sep. 8, 2012].

Bryant, Polar Rose: Face recognition for Facebook and Flickr. The Next Web. Oct. 12, 2009;p. 1-4. http://thenextweb.com/2009/10/12/polar-rose-face-recognition-facebook-flickr/ [last accessed Sep. 8, 2012].

Hunt, Facebook gets face recognition. APC Magazine. Mar. 27, 2009; p. 1-2. http://apcmag.com/facebook-gets-facial-recognition.htm [last accessed Oct. 30, 2011].

Shankland, Revamped Google Picasa site identifies photo faces. CNET News. Sep. 2, 2008;p. 1-6. http://news.cnet.com/8301-13580_3-10026577-39.html [last accessed Sep. 8, 2012].

Bitouk et al., Face swapping: automatically replacing faces in photographs. ACM Trans Graph. Aug. 2008; 27(3):39:1-39:8.

\* cited by examiner

FIG.3

| USER | FACE OF PERSON USED AS CONDITION FOR SHARING, ACCEPTANCE OF SHARING, AND THE LIKE | | | | |
|---|---|---|---|---|---|
| | A | B | C | D | E |
| A | | FACE DATA B, SHARING ACCEPTED | | | |
| B | FACE DATA A, SHARING ACCEPTED | | | FACE DATA D, SHARING REJECTED | |
| C | | | | | |
| D | | | | | |
| E | | | | | |
| F | | | | | |

FIG.4

|  | A | B | C | D | E |
|---|---|---|---|---|---|
| USER A |  | SHARING ACCEPTED |  | SHARING REJECTED |  |
| B | SHARING ACCEPTED |  | SHARING REJECTED |  |  |
| C | SHARING ACCEPTED | SHARING ACCEPTED |  |  |  |
| D |  |  |  |  |  |
| E |  |  |  |  |  |
| F |  |  |  |  |  |

USER TO WHOM DISTRIBUTION IS ALLOWED, OR USER TO WHOM DISTRIBUTION IS NOT ALLOWED

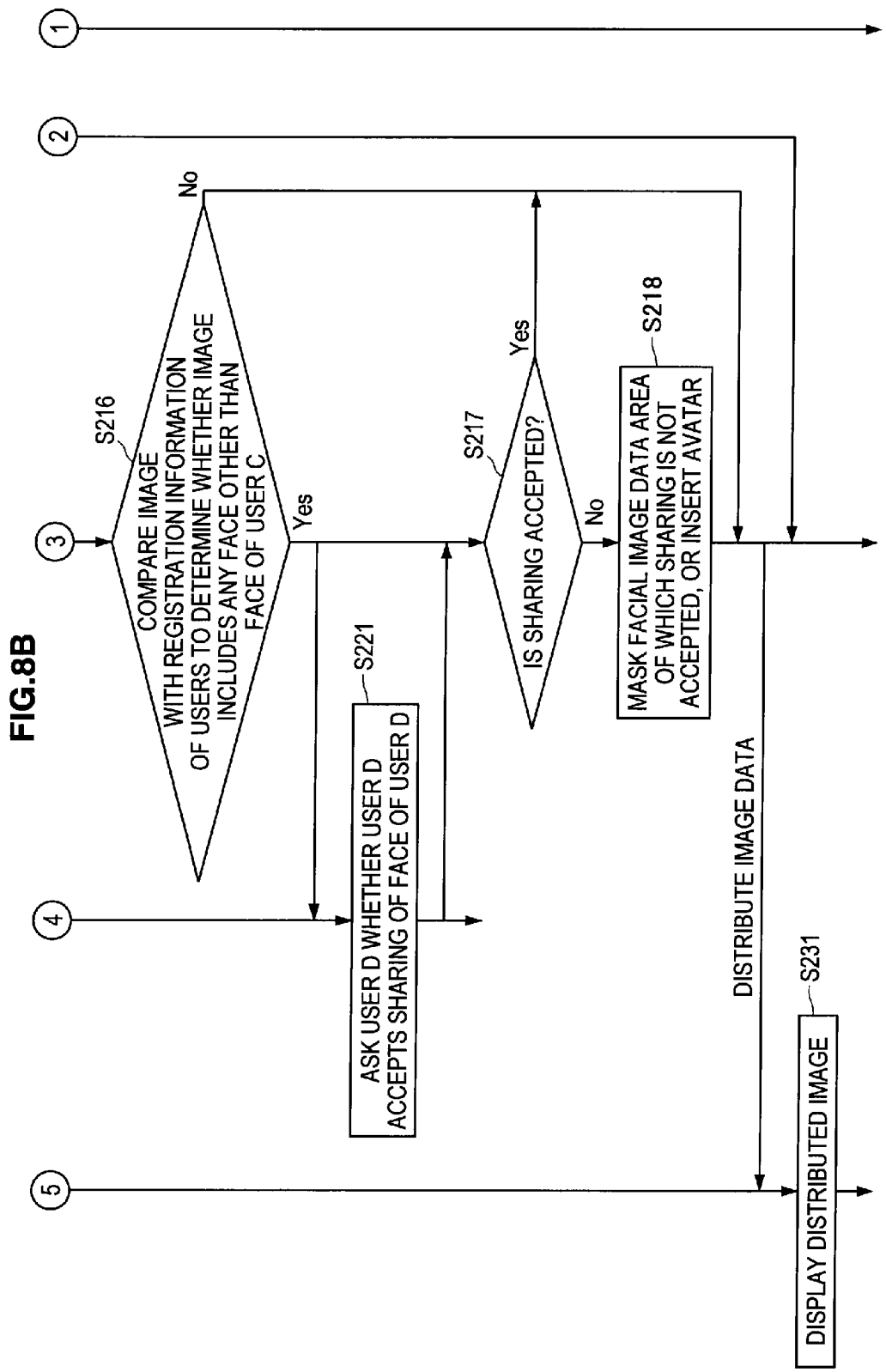

OBSCURING IMAGE OF PERSON IN PICTURE WHEN CONSENT TO SHARE IMAGE IS DENIED

BACKGROUND

The present disclosure relates to an information processing apparatus, an information processing method, and a program.

In a system in which a plurality of users connect to a server via a communication network, the plurality of users may share various kinds of data stored in the server, for example, image data such as pictures and motion pictures and audio data such as music.

For example, Japanese Patent Application Laid-Open No. 2007-334696 discloses a technique for dividing image data received by a server into categories and saving the image data in each category, thus allowing a user to efficiently use desired image data. Japanese Patent Application Laid-Open No. 2007-249821 discloses a technique using positional information and time information to allow a plurality of users participating in a common event to share contents.

SUMMARY

The image data sharing system in the related art is extremely convenient when a user obtains a picture or a motion picture including the user himself or obtains a picture or a motion picture including a child of the user. However, in the image data sharing system, a user's private picture may be shared by another person against the will of the user.

An example of a system will be explained. In this system, a user who uses sharing service sets a sharing condition of image data to be shared, and image data matching the defined sharing condition are shared with users. This system will be hereinafter explained. The image data are stored in the server. In this system, an issue would arise when a user who wants to obtain an image sets a facial image of another person as a sharing condition and requests sharing of image data including the another person.

For example, a user A sets a facial image of a user B, i.e., a user other than the user A, as a sharing condition and requests sharing of image data including the user B. In this case, the circumstances change according to a person who takes a picture and with whom the user A shows up in the picture, and FIG. 2 shows typical cases.

Case 1: the user B takes a picture including himself (user B) and a user C.

In this case, the user B is the photographer and the owner of the picture. Accordingly, the user A requests the user B to share the picture. Therefore, the user B is a "shared person", i.e., a person whose image data are shared, and the user B can recognize that the image data of the user B are shared. Therefore, no privacy issue of the user B would arise in this case. On the other hand, the user B, i.e., the owner, is set as the sharing condition, but the picture includes not only the user B but also the user C. This means that the picture including the user C is distributed to the user A without the user C knowing. As a result, a privacy issue of the user C, who is a person other than the owner of the picture, may arise in this case.

Case 2: the user C takes a picture including himself (user C) and the user B.

In this case, the user C is the photographer and the owner of the picture. Accordingly, the user A requests the user C to share the picture. Therefore, the user C is a shared person whose image data are shared, and the user C can recognize that the image data of the user C are shared. Therefore, no privacy issue of the user C would arise in this case. On the other hand, the user B is set as the sharing condition, and the picture includes not only the user B but also the user C. This means that the picture including the user B is distributed to the user A without the user B knowing. As a result, a privacy issue of the user B, who is set as the sharing condition, may arise in this case.

Case 3: the user C takes a picture including the user B and a user D.

In this case, the user B is set as the sharing condition, and the picture includes not only the user B but also the user D. This means that the picture including the users B and D is distributed to the user A without the users B and D knowing. As a result, a privacy issue of the user B, who is set as the sharing condition, and the user D, who is a person other than the owner of the picture, may arise in this case.

Case 4: the user D takes a picture including the user B, the user C, and the user D.

Even when three or more persons show up in the picture as in this case, this case can be considered in the same manner as Cases 1 to 3. When a facial image of a user is set as a sharing condition, this may cause a privacy issue of a user who is a person other than the owner of the picture.

As can be understood from the above, a user set as a sharing condition and another user showing up in a picture together with the user set as the sharing condition may suffer the privacy issue.

By the way, a case where the user A sets the facial image of the user B, who is a person other than the user A, as the sharing condition, and the user A requests sharing of image data including the user B may be the following case for example: the user A is a grandparent and the user B is a grandchild. As described above, the image data sharing system is very useful when a grandparent sets a facial image of a grandchild as a sharing condition, and the grandparent requests sharing of image data including the grandchild. As described above, however, a privacy issue would arise, and there is a great risk. Therefore, careful consideration is necessary.

In the example explained above, the user A sets the picture including the facial image of the user B as the sharing condition. However, even when the user A sets the face of the user A himself as the sharing condition, the another user showing up in the picture together with the user A set as the sharing condition would also suffer the privacy issue.

In light of the foregoing, it is desirable to provide an information processing apparatus, information processing method, and program, which are novel and improved, and which are capable of reducing privacy issue that a user suffers when image data are shared.

Some embodiments of the invention provide a server apparatus, comprising: a control block comprising at least one processor; at least one data reception unit operable to receive a request to share a picture; at least one storage facility, storing programmed instructions for execution by the control block, the programmed instructions defining an image analysis engine operable to determine that the picture comprises an image of a person; and at least one data transmission unit operable to issue a request to the person, or someone associated with the person, to consent to sharing the image. The server apparatus may, for example, further comprise a data storage unit; and the image analysis engine may be operable to analyze the picture to determine that the picture includes an image, and to compare at least one characteristic of the image to one or more stored image characteristics stored by the data storage unit to determine that the image depicts the person. The programmed instructions may, for example, define an image processing unit operable to, if the response to the request indicates that consent to sharing the image is not given, modify the picture to obscure the image of the person, such as by blurring the image and/or replacing the image with an avatar.

Other embodiments of the invention provide a client apparatus for use in a system comprising at least one network to which the client apparatus is coupled. The client apparatus is usable by a first user, and comprises: a control block comprising at least one processor; at least one data reception unit operable to receive, via at least one network, an indication that a second user has requested to share a picture comprising a first image, the image depicting the first user or a person associated with the first user; at least one storage facility storing programmed instructions for execution by the control block, the programmed instructions operable to receive input from the first user defining whether consent to sharing the first image is given; and at least one data transmission unit operable to send a representation of the first user's input via the at least one network. The at least one data reception unit may, for example, be operable to receive an indication that the second user has requested to share the picture with a third user. The programmed instructions may, for example, be operable to receive input indicating whether sharing requested by the second user is granted, and/or whether consent to sharing requested by any of a plurality of users is granted.

Other embodiments of the invention provide a method, performed by at least one computer. The method comprises: (A) receiving a request to share a picture; (B) determining that the picture comprises an image of a person; and (C) requesting that the person, or someone associated with the person, consent to sharing the image.

Still other embodiments of the invention provide a method, performed by a computer employed by a first user. The computer is coupled via at least one network to at least one other computer. The method comprises: (A) receiving an indication that a second user has requested to share a picture comprising a first image, the first image depicting the first user or a person associated with the first user; (B) receiving input from the first user defining whether consent to sharing the first image is given; (C) sending a representation of the input to the at least one computer via the at least one network.

Yet other embodiments of the invention provide at least one computer-readable medium having instructions encoded thereon which, when executed by at least one computer, perform a method comprising: (A) receiving a request to share a picture; (B) determining that the picture comprises an image of a person; and (C) requesting that the person, or someone associated with the person, consent to sharing the image.

Still other embodiments of the invention provide at least one computer-readable medium having instructions encoded thereon which, when executed by a computer employed by a first user, the computer being coupled via at least one network to at least one other computer, perform a method comprising: (A) receiving an indication that a second user has requested to share a picture comprising a first image, the first image depicting the first user or a person associated with the first user; (B) receiving input from the first user defining whether consent to sharing the first image is given; (C) sending a representation of the input to the at least one computer via the at least one network.

As described above, some embodiments of the invention may enable privacy issues such as those described above to be mitigated.

BRIEF DESCRIPTION OF THE DRAWINGS

FIG. 3 is a table illustrating which user wishes to share whose facial image and whether the person of the facial image accepts sharing or not;

FIG. 4 is a table illustrating users to whom distribution is allowed, or users to whom distribution is not allowed;

FIG. 8B is a flowchart illustrating processing when image data are distributed.

DETAILED DESCRIPTION OF THE EMBODIMENTS

Figure 1:
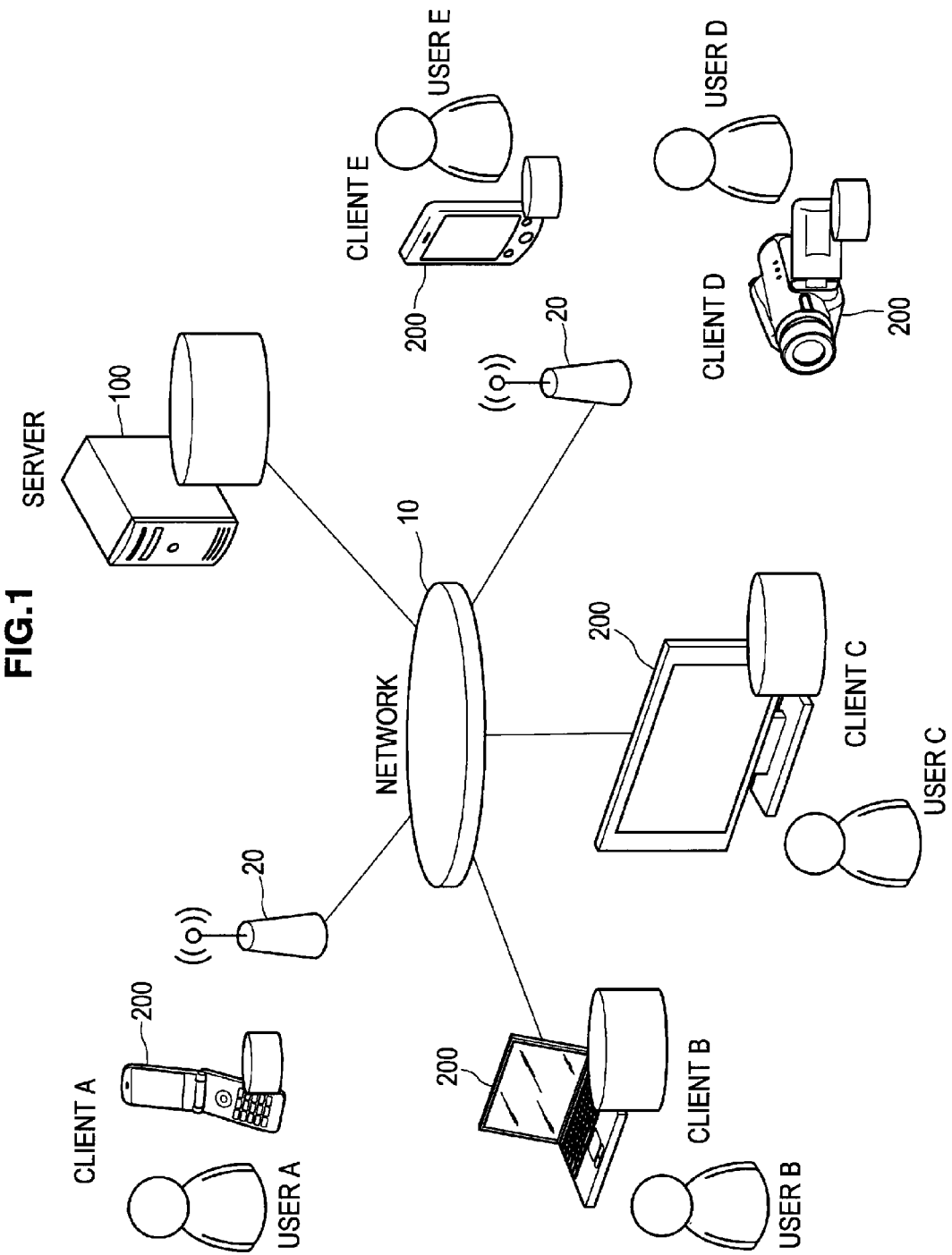
FIG. 1 is a schematic diagram illustrating an image sharing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order listed below.

1. Configuration of embodiment
2. Operation of embodiment

<1. Configuration of Embodiment>

FIG. 1 is a schematic diagram illustrating an image sharing system according to the present embodiment. This system includes a server apparatus 100 and a plurality of client apparatuses 200 which are connected via a network 10. The communication circuit may be either a wireless communication such as WiFi, W-CDMA, LTE, and WiMAX, and a wired communication such as an optical fiber and ADSL. In the wireless communication, a base station 20 and the like are used.

The client apparatus 200 is, for example, a PC, a PDA, a portable terminal, and the like. The client apparatus 200 may be in any form as long as it has functions and performance for retrieval and display of image data that a user needs.

The server apparatus 100 holds data of all the users. Data stored in the server apparatus 100 are attached with metadata such as a location where a picture is taken and a time when a picture is taken.

A user registers the following information to the server apparatus 100 in advance as necessary: an ID, family information, facial image data of the user, facial image data of children and grandchildren serving as sharing conditions, individual attributes such as friend information, company information, and hobbies, and authentication information such as a password. When the user accesses the data stored in the server apparatus 100, the user is authenticated as necessary using a log in ID so as to log into the server apparatus 100.

Figure 5:
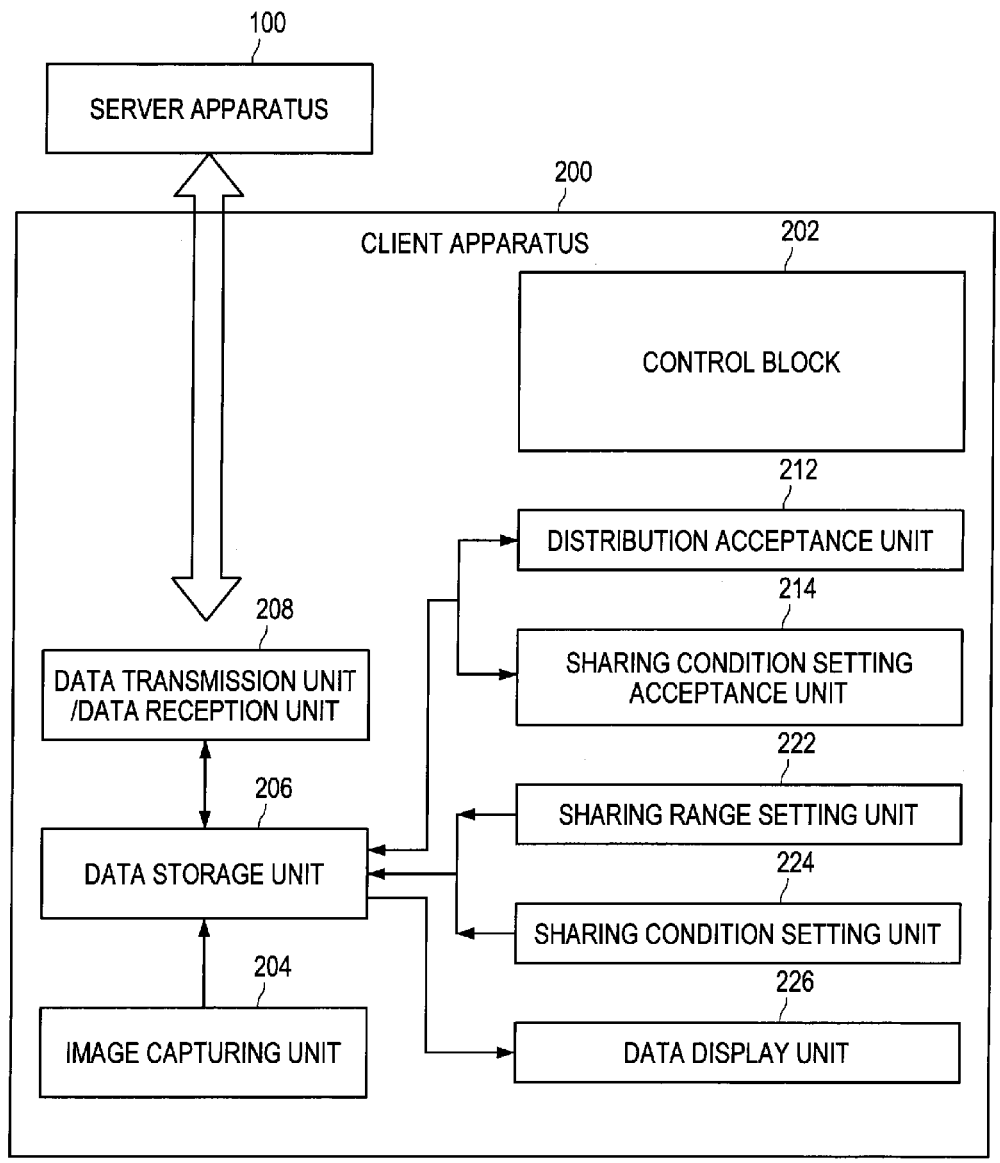
FIG. 5 is a block diagram illustrating constituent elements of a client apparatus 200.

FIG. 5 is a block diagram illustrating constituent elements of the client apparatus 200.

The client apparatus 200 has an image capturing unit 204, and has a mechanism for retrieving image data taken by the image capturing unit 204 into a data storage unit 206 in the client apparatus 200. A data display unit 226 displays a picture and a motion picture on a screen based on image data stored in the server apparatus 100 or the client apparatus 200.

The client apparatus 200 has an interface function with a user, and includes a data transmission unit/data reception unit 208 capable of transmitting/receiving data to/from the server, a control block 202, and the like. The client apparatus 200 can freely use each function with programming. The control block 202 is constituted by a CPU for example, and controls operational processing and each constituent element.

For the interface function, the client apparatus 200 includes a distribution acceptance unit 212, a sharing condition setting acceptance unit 214, a sharing range setting unit 222, and a sharing condition setting unit 224, and has the following functions.

When a picture including the user himself is requested to be distributed to another user, the distribution acceptance unit 212 receives such request and transmits acceptance or rejection in reply to the request.

The privacy of the user may be invaded in the future if another user sets a facial image of the user or a person other than the user as a sharing condition, and a picture including the user is distributed to another user based on the sharing condition thus set. The distribution acceptance unit 212 receives a request and transmits acceptance or rejection in reply to the request, so that the picture including the user is prevented from being distributed without the user knowing.

When another user requests sharing of the user's facial image, the sharing condition setting acceptance unit 214 receives such request and transmits acceptance or rejection in reply to the request.

The privacy of the user may be invaded in the future if another user sets the user's facial image as a sharing condition. Therefore, the server apparatus 100 notifies the user set as the sharing condition that the user is set as the sharing condition, and confirms with the user that the user is set as the sharing condition. The client apparatus 200 receives the confirmation from the server apparatus 100, and transmits a response to the server apparatus 100.

FIG. 3 is a table generated by the following process. Sharing conditions are set with the client apparatuses 200 respectively owned by the plurality of users, and an acceptance or rejection is given to the sharing condition settings. The table of FIG. 3 shows a facial image of a person used as a condition for sharing desired by each user, and also shows whether the person accepts sharing or not when sharing is desired. For example, FIG. 3 shows that a user A desires sharing of a facial image B of a user B, and the user B accepts sharing. In addition, the user A desires sharing of a facial image D of a user D, but the user D does not accepts sharing.

The sharing range setting unit 222 sets a range in which the images owned by the user and stored in the server apparatus 100 are shared, or sets persons with whom the images are not to be shared.

FIG. 4 is a table generated by the process for setting the sharing range. The table of FIG. 4 shows the sharing range indicating a user to whom distribution is allowed by each user, or a user to whom distribution is not allowed. For example, the user A allows distribution to the user B but does not allow distribution to the user D.

The sharing condition setting unit 224 sets a user's facial image and condition which are expected to set for sharing by other users. The sharing condition setting unit 224 also sets other users' facial images and conditions which are set for sharing.

Figure 6:
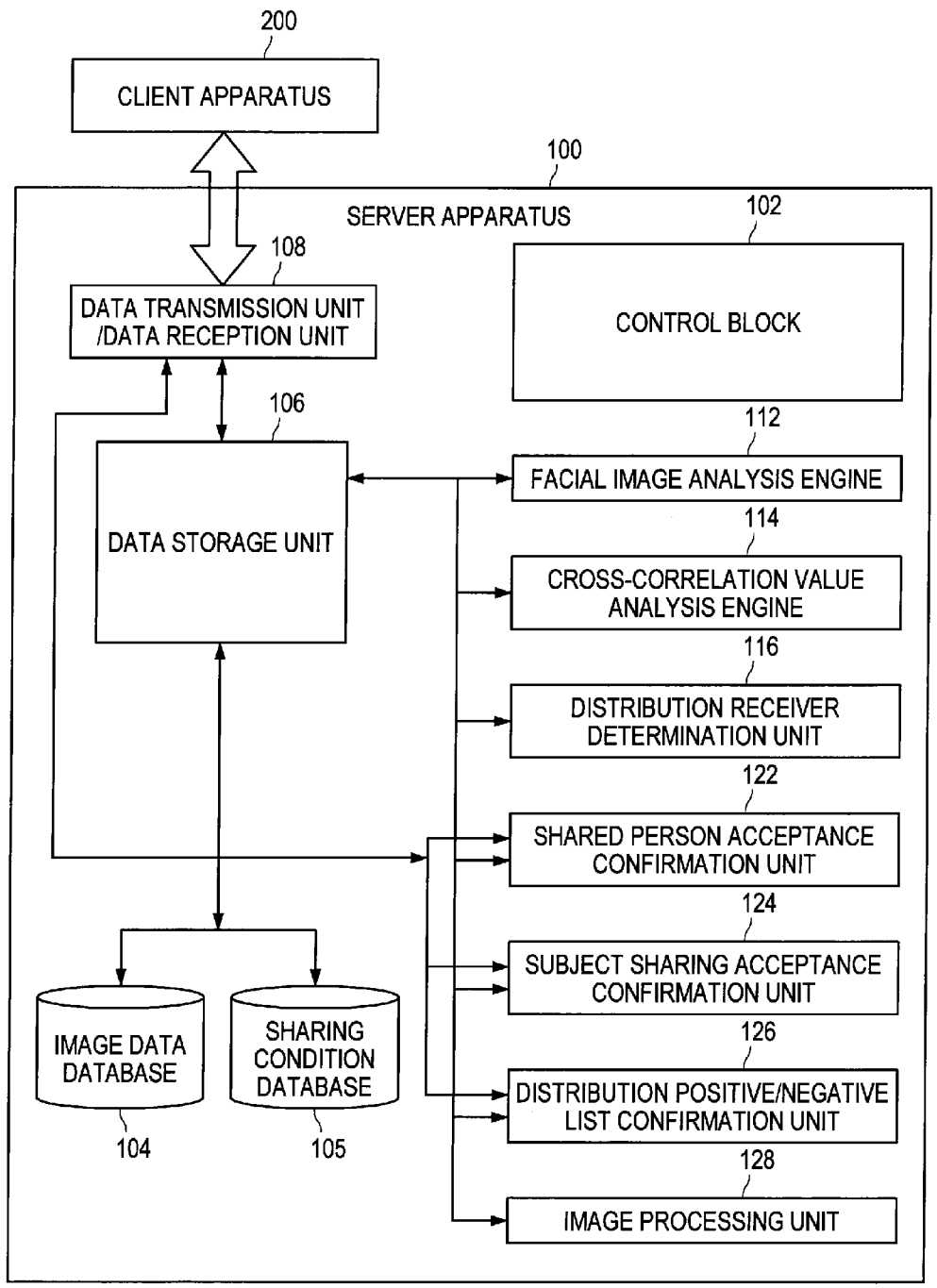
FIG. 6 is a block diagram illustrating constituent elements of a server apparatus 100.

FIG. 6 is a block diagram illustrating constituent elements of the server apparatus 100.

The server apparatus 100 includes a control block 102, an image data database 104, a sharing condition database 105, a data storage unit 106, a data transmission unit/data reception unit 108, a facial image analysis engine 112, a cross-correlation value analysis engine 114, a distribution receiver determination unit 116, a shared person acceptance confirmation unit 122, a subject sharing acceptance confirmation unit 124, a distribution positive/negative list confirmation unit 126, and the like. The control block 102 is constituted by a CPU for example, and controls operational processing and each constituent element.

The image data database 104 stores image data and facial images uploaded by the users. The sharing condition database 105 stores the sharing conditions set by the client apparatus 200, recognition vectors obtained from analysis results of the facial images, and the tables shown in FIGS. 3 and 4.

The data transmission unit/data reception unit 108 transmits and receives control commands and data to/from the client apparatuses 200.

The facial image analysis engine 112 analyzes the facial images. The cross-correlation value analysis engine 114 calculates correlation between feature quantities based on the analyzed facial images, and calculates the degrees of similarities between the plurality of faces.

The distribution receiver determination unit 116 determines a user to whom an image is distributed and persons affected by the shared picture (persons showing up in the picture) based on the degree of similarity between the facial image set as the sharing condition and the image stored in the server apparatus 100 which is calculated by the correlation value analysis of the facial image. Accordingly, a user with whom the image stored in the server apparatus 100 is to be shared and a person shared in the image stored in the server apparatus 100 are determined.

The shared person acceptance confirmation unit 122 receives a notification indicating that a setting of a sharing condition is requested from the client apparatus 200 requesting the sharing based on a facial image of a certain user. The shared person acceptance confirmation unit 122 notifies the client apparatus 200 of a user corresponding to the sharing condition (shared person) that the setting of the sharing condition is requested. The shared person acceptance confirmation unit 122 receives acceptance or rejection in reply to the request of the setting of the sharing condition from the client apparatus 200 of the user corresponding to the sharing condition (shared person). As a result, a table as shown in FIG. 3 is generated. The shared person acceptance confirmation unit 122 transmits the result indicating acceptance or rejection to the client apparatus 200 having requested the setting of the sharing condition.

When the facial image is set as the sharing condition, and a picture including the user is distributed based on the sharing condition, the subject sharing acceptance confirmation unit 124 notifies the client apparatus 200 of the user that there is a possibility that the picture may be distributed. The subject sharing acceptance confirmation unit 124 receives acceptance or rejection of distribution of the picture including the user from the client apparatus 200 of the user.

The distribution positive/negative list confirmation unit 126 receives a setting of a range in which an image stored in the server apparatus 100 is shared or a setting of persons with whom the image stored in the server apparatus 100 is not to be shared, from the client apparatus 200 of a user who owns the image. As a result, a table as shown in FIG. 4 is generated.

When the subject sharing acceptance confirmation unit 124 indicates that the user does not accept distribution of a picture, an image processing unit 128 performs masking processing such as shading on the facial portion of the user in the picture. Alternatively, the image processing unit 128 may insert an avatar image to the facial portion of the user in the picture. The avatar image is an image of a character that can be used to replace the user. It should be noted that the masking processing and the insertion processing of the avatar image are not limited to a case where the user does not accept the distribution of the picture. For example, regardless of whether the user accepts or rejects, the masking processing and the insertion processing of the avatar image may be performed on the facial portion of the predetermined user when the picture includes the facial portion of the predetermined user.

<2. Operation of Embodiment>

Subsequently, operation of an image sharing system according to the present embodiment will be explained.

According to the present embodiment, 1) when the client apparatus 200 of a user registers a facial image of another user (for example, a friend) as a sharing condition, the server apparatus 100 checks with the friend's client apparatus 200 as to whether the facial image can be used as the sharing condition or not. As a result, it is possible to check with the user set as the sharing condition as to whether the setting of the user who sets the sharing condition is appropriate or not. Therefore, the privacy issue can be avoided.

Further, 2) the client apparatus 200 of a user who owns image data sets allowance and prohibition of sharing, thus setting a sharing range. As a result, the owner of the image data can determine whether permission is given to share the image, thereby preventing unnecessary sharing of images. Therefore, the privacy issue can be avoided. It should be noted that the setting of the sharing range may be set in units of users, or may be set in units of albums each including images satisfying a certain condition. Alternatively, the setting of the sharing range may be set on each piece of image data. The setting of the sharing range may be implemented as necessary.

Still further, 3) when image data satisfying a sharing condition and stored in the server apparatus 100 includes a facial image of another user (a friend), the client apparatus 200 owned by the friend is requested to determine whether to accept sharing or not. The region of the facial image of the friend may be intentionally shaded, or an avatar may be inserted thereinto, and thereafter the image may be distributed. As a result, when one image includes a plurality of users at a time, permissions can be obtained from the users showing up in the picture. Therefore, the privacy issue can be avoided.

Figure 7:
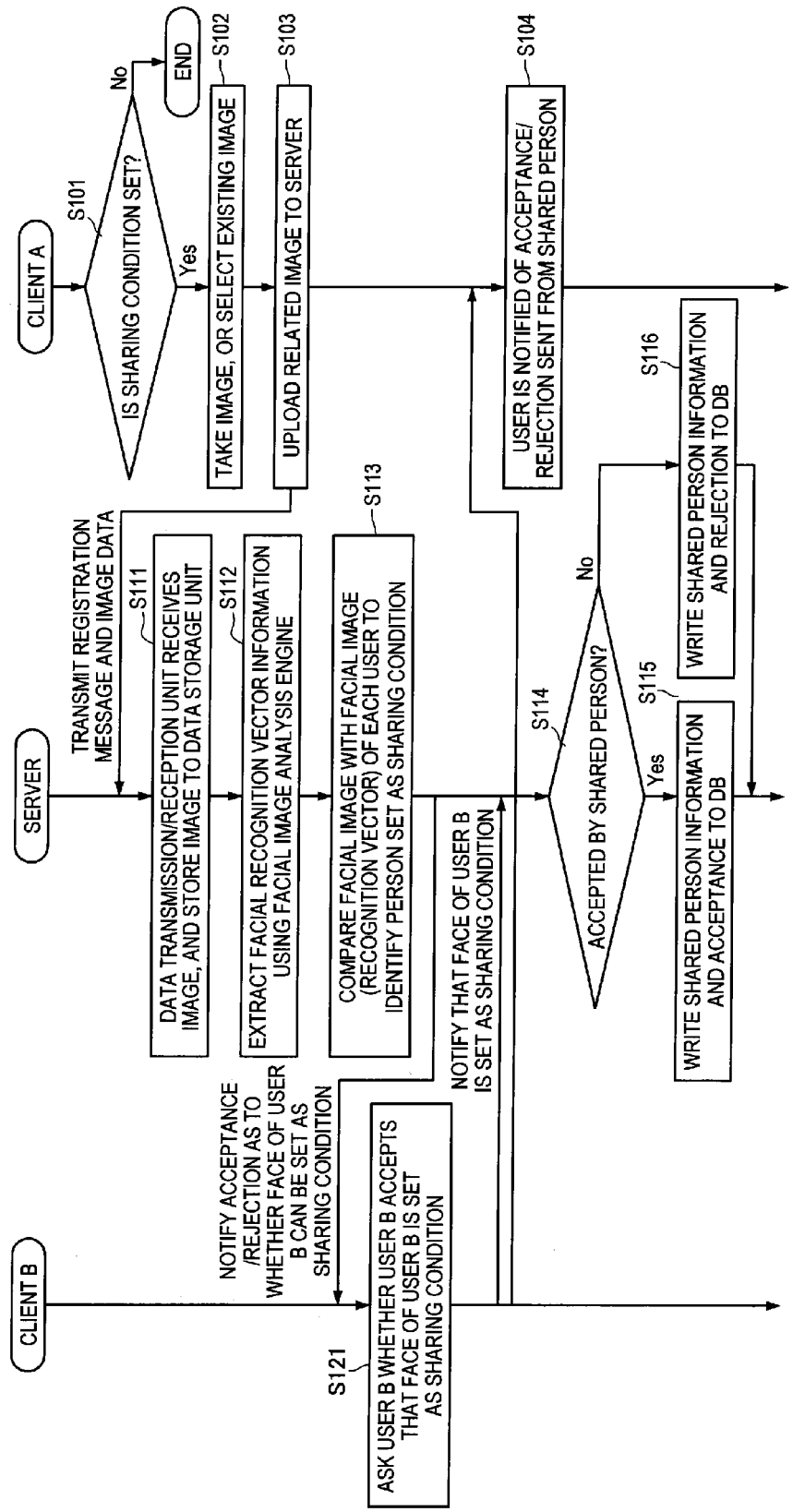
FIG. 7 is a flowchart illustrating processing when a sharing condition is set.

FIG. 7 is a flowchart illustrating processing when a sharing condition is set.

In this example, a user A uses a facial image of a user B to set a sharing condition. The flow for setting the sharing condition will be explained using this flowchart.

A client A (the client apparatus 200 of the user A) determines whether a sharing condition is set or not (step S101). When the sharing condition is not to be set, the client A terminates the processing. On the other hand, when the sharing condition is to be set, the user A first takes a picture of a facial image set as the sharing condition and selects the picture, or selects a setting menu of the sharing condition and selects the facial image set as the sharing condition from among existing images (step S102). The facial image selected here may be a facial image of a friend, a facial image of a grandchild, and the like.

As a result, image data including the selected facial image are uploaded to the server apparatus 100. Then, the server receives a registration message indicating that the user A has set the sharing condition (step S103).

The server apparatus 100 receives the facial image from the client apparatus 200, and stores the received facial image to the data storage unit 206 (step S111). Then, the received image data are analyzed using the facial image analysis engine 112, so that meta information about the face (for example, the position of the face in the image and the like) and vector information for recognizing the face are extracted (step S112).

Subsequently, using the vector information for recognizing the face, the cross-correlation value analysis engine 114 calculates the degree of similarity between the facial image selected as the sharing condition by the client A and the registered image of each user, and identifies the user set as the sharing condition by the client A (step S113). The registered image of each user is an image registered in the server apparatus 100 by each user in advance.

Then, when the user B is identified, the server apparatus 100 notifies the client B (the client apparatus 200 of the user B) that the user A sets the user B as the sharing condition. The client B notifies the user B that the user A is going to set the facial image of the user B as the sharing condition and asks the user B as to whether the user B gives permission or not (step S121).

In response to the request from the server apparatus 100, the client B notifies the server apparatus 100 and the client A as to whether the user B accepts that the facial image of the user B is set as the sharing condition. The client A notifies the user A of the result of the setting of the sharing condition (for sharing the facial image of the user B) (step S104).

When a user other than the user B is identified by mistake in step S113, the user identified by mistake receives a notification that the user A is going to set the user as the sharing condition. However, when the user who owns the image data sets the sharing range by setting permission and prohibition of the sharing, erroneous distribution can be prevented.

When the user B accepts the setting of the sharing condition (for sharing the facial image of the user B), the server apparatus 100 writes the sharing condition set by the client A (shared person information) and the acceptance information (permission) given by the client B to the sharing condition database 105 (step S115). On the contrary, when the user B rejects the sharing, the shared person information and the acceptance information (rejection) given by the client B are written to the sharing condition database 105 (step S116). As a result, the table as shown in FIG. 3 is generated.

When the user B accepts the sharing, the user A can share various images including the facial image of the user B stored in the server apparatus 100. On the other hand, when the user B does not accept the sharing, images including the facial image of the user B stored in the server apparatus 100 may not be shared. When the user B does not accept the sharing, the sharing condition is disregarded.

Figure 8A:
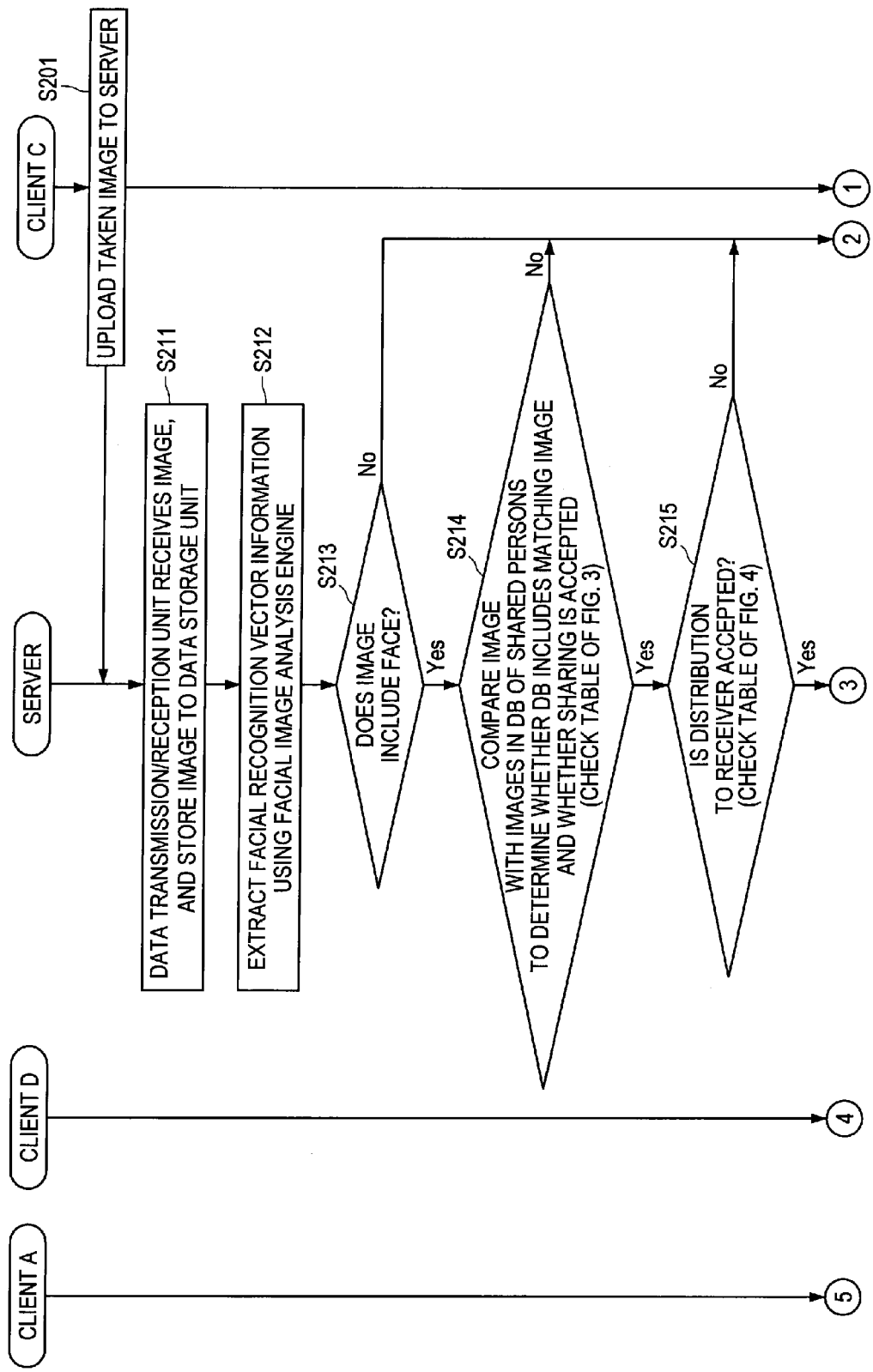
FIG. 8A is a flowchart illustrating processing when image data are distributed.

FIG. 8 is a flowchart when an image is distributed.

Figure 2:
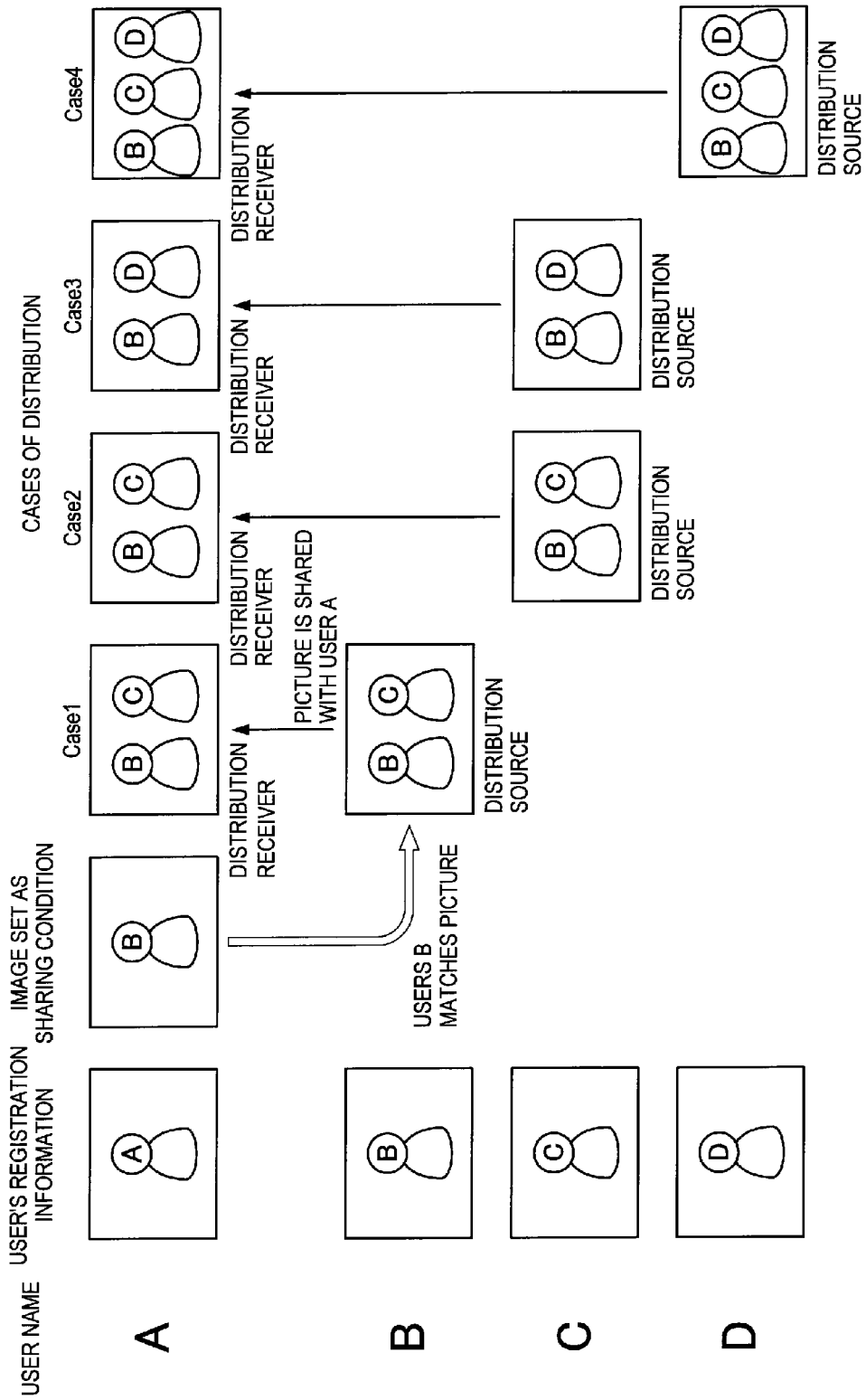
FIG. 2 is an explanatory diagram illustrating a case of a distribution which causes privacy issue.

This example is the case corresponding to Case 3 in FIG. 2. In other words, it is a flowchart during image distribution when the user C generates image data by taking a picture of the user B and the user D, and the facial image of the user B is set as the sharing condition by the user A.

The flow for distributing image data will be explained using this flowchart.

First, the user C generates image data by taking a picture. It is assumed that the taken image data include the user B and the user D. Then, the image data are uploaded by the client C to the server apparatus 100 (step S201).

The server apparatus 100 receives the taken image data from the client apparatus 200, and stores the received image to the data storage unit 206 (step S211). Then, the received image data are analyzed using the facial image analysis engine 112, so that meta information about the face (for example, the position of the face in the image and the like) and vector information for recognizing the face are extracted (step S212).

Subsequently, when the image is determined to include a face (step S213), the cross-correlation value analysis engine 114 uses the vector information for recognizing the face to calculate the degree of similarity between the taken image thus received and the facial image of each user which is accepted to be set as the sharing condition and stored in the sharing condition database 105, thus performing collation process (step S214). For example, the table as shown in FIG. 3 is used for the collation process. Therefore, the determination can be made as to whether the taken image includes any facial image set as the sharing condition. In this example, the taken image matches the face of the sharing condition (user B) set by the user A. Therefore, there is a possibility that the taken image may be shared by the user A.

Subsequently, a determination is made as to whether the use C who owns the image accepts distribution to the user A in advance based on the table as shown in FIG. 4, for example (step S215). When the user C accepts the distribution, step S216 is subsequently performed.

Thereafter, a determination is made as to whether the taken image includes any user other than the user C. In other words, the server apparatus 100 compares the image with registered information about the plurality of users, and determines whether the taken image includes any facial image of a user other than the user C (step S216). In this example, the image includes the user D. Accordingly, the client D (the client apparatus 200 of the user D) is requested to determine whether to accept distribution or not (step S221).

In reply to the inquiry from the server apparatus 100, the client D asks the user D whether the user D accepts sharing of the facial image of the user D, and obtains the user D's intention of sharing of the facial image of the user D (step S221).

When the user D accepts the sharing (step S217), the server apparatus 100 maintains the taken image as it is. On the other hand, when the user D does not accept the sharing (step S217), the facial image data area of the user D is masked, or an avatar is inserted to the facial image data area of the user D (step S218).

Thereafter, the server apparatus 100 distributes the taken image to the client A (the client apparatus 200 of the user A) that sets the user B as the sharing condition. As a result, the client A can display the distributed image taken by the user C.

The image distribution is determined based on the above flowchart, whereby the image data can be shared in view of the privacy.

As described above, the present embodiment can reduce the privacy issue that arises when a user who receives shared information sets a sharing condition of image data stored in the server apparatus 100 in the system in which the client apparatuses 200 of the plurality of users connect to the server apparatus 100 via the communication network 10.

For example, an owner of image data sets a sharing range, so that the privacy issue does not arise when the image data are shared. Then, a user is asked whether the user accepts that the facial image of the user is set as the sharing condition in advance, and another user showing up in an image is asked whether the another user accepts that the facial image of the another user is shared. As a result, this system can share images uploaded by the users expecting that the uploaded images are shared by others, while the privacy of each person is taken into consideration. On the other hand, when the sharing is not accepted, the facial portion is masked, or an avatar is inserted into the facial portion, so that the privacy can be protected.

The system according to the present embodiment may not be necessary for all the image data. For example, when pictures taken at a wedding ceremony and the like are distributed to friends of a user, the privacy issue does not arise in most cases. Therefore, the system according to the present embodiment may be implemented as necessary, or may be configured to be turned on/off.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-155598 filed in the Japan Patent Office on Jul. 8, 2010, the entire content of which is hereby incorporated by reference.

What is claimed is:

1. A server apparatus, comprising:
a control block comprising at least one processor;
at least one data reception unit operable to receive a request to share a picture;
at least one storage facility, storing programmed instructions for execution by the control block, the programmed instructions defining an image analysis engine operable to determine that the picture comprises an image of a person; and
at least one data transmission unit operable to issue a request to the person, or someone associated with the person, to consent to sharing the image;
wherein the data reception unit is operable to receive a response to the request, and wherein the at least one storage facility stores programmed instructions defining an image processing unit operable to, if the response to the request indicates that consent to sharing the image is not given, modify the picture to obscure the image of the person.

2. The server apparatus of claim 1, further comprising:
a data storage unit;
wherein the image analysis engine is operable to analyze the picture to determine that the picture includes an image, and to compare at least one characteristic of the image to one or more stored image characteristics stored by the data storage unit to determine that the image depicts the person.

3. The server apparatus of claim 1, wherein the data transmission unit is operable to issue a request to consent to sharing the image with a particular user.

4. The server apparatus of claim 1, wherein the image processing unit is operable to modify the picture by blurring the image and/or replacing the image with an avatar.

5. The server apparatus of claim 1, wherein the at least one storage facility stores programmed instructions defining a subject sharing acceptance confirmation unit operable to, if the response to the request indicates that consent to share the image is given, issue a notification that the picture is to be shared.

6. The server apparatus of claim 1, further comprising a data storage unit and a sharing condition database, the data storage unit being operable to store in the sharing condition database an indication of the received response.

7. The server apparatus of claim 6, wherein the data reception unit is operable to receive the request to share the picture from a first user, and wherein the data storage unit is operable to store in the sharing condition database an indication whether consent to sharing requested by the first user is given.

8. The server apparatus of claim 6, wherein the data reception unit is operable to receive the request to share the picture with a second user, and wherein the data storage unit is operable to store in the sharing condition database an indication whether consent to sharing with the second user is granted.

9. The server apparatus of claim 8, wherein the data storage unit is operable to store in the sharing condition database an indication whether consent to sharing with a third user is granted.

10. The server apparatus of claim 6, wherein the data reception unit is operable to receive a request to share a second picture comprising a second image of the person, and wherein the at least one storage facility further stores programmed instructions that, when executed by the control block, access the indication stored in the sharing indication database to determine whether consent to sharing the second image is given.

11. A method, performed by at least one computer, the method comprising:

(A) receiving a request to share a picture;
(B) determining that the picture comprises an image of a person;
(C) issuing a request to the person, or someone associated with the person, to consent to sharing the image;
(D) receiving a response to the request; and
(E) if the response to the request indicates that consent to sharing the image is not given, modifying the picture to obscure the image of the person.

12. At least one storage device having stored thereon instructions which, when executed by at least one computer, perform a method comprising:

(A) receiving a request to share a picture;
(B) determining that the picture comprises an image of a person;
(C) issuing a request to the person, or someone associated with the person, to consent to sharing the image;
(D) receiving a response to the request; and
(E) if the response to the request indicates that consent to sharing the image is not given, modifying the picture to obscure the image of the person.

* * * * *